US006049800A

United States Patent [19]

Govindarajan et al.

[11] Patent Number: 6,049,800

[45] Date of Patent: Apr. 11, 2000

[54] MECHANISM AND METHOD FOR PERFORMING CALLBACKS

[75] Inventors: Rajagopalan Govindarajan, Fremont; Jacco Draaijer, Mountain View, both of Calif.

[73] Assignee: Oracle Corporation, Redwood Shores, Calif.

[21] Appl. No.: 08/962,537

[22] Filed: Oct. 31, 1997

Related U.S. Application Data

[63] Continuation-in-part of application No. 08/880,326, Jun. 23, 1997.

[51] Int. Cl.[7] .......... G06F 17/30

[52] U.S. Cl. .......... 707/10; 707/100; 707/103

[58] Field of Search .......... 364/200; 707/536, 707/10, 9, 8, 100, 103

[56] References Cited

U.S. PATENT DOCUMENTS

| | | | |
|---|---|---|---|
| 4,736,321 | 4/1988 | Brown et al. | 364/300 |
| 4,949,255 | 8/1990 | Gerth et al. | 364/200 |
| 5,257,366 | 10/1993 | Adair et al. | 707/4 |
| 5,416,917 | 5/1995 | Adair et al. | 707/203 |
| 5,452,450 | 9/1995 | Delory | 707/10 |
| 5,455,948 | 10/1995 | Poole et al. | 707/102 |
| 5,524,253 | 6/1996 | Pham et al. | 709/202 |
| 5,539,886 | 7/1996 | Aldred et al. | 395/200.04 |
| 5,542,078 | 7/1996 | Martel et al. | 707/101 |
| 5,596,744 | 1/1997 | Dao et al. | 707/10 |
| 5,608,874 | 3/1997 | Ogawa et al. | 709/246 |
| 5,617,533 | 4/1997 | Wu et al. | 395/183.14 |
| 5,627,972 | 5/1997 | Shear | 709/246 |
| 5,651,111 | 7/1997 | McKeeman et al. | 395/183.14 |
| 5,655,116 | 8/1997 | Kirk et al. | 707/1 |
| 5,706,499 | 1/1998 | Kleewein et al. | 707/10 |
| 5,710,918 | 1/1998 | Lagarde et al. | 707/10 |
| 5,713,014 | 1/1998 | Durflinger et al. | 707/4 |
| 5,721,904 | 2/1998 | Ito et al. | 707/8 |
| 5,745,754 | 4/1998 | Lagarde et al. | 707/104 |
| 5,764,949 | 6/1998 | Huang et al. | 707/102 |
| 5,768,577 | 6/1998 | Kleewein et al. | 707/10 |
| 5,768,589 | 6/1998 | Bradley et al. | 709/304 |
| 5,787,452 | 6/1998 | McKenna | 707/536 |
| 5,794,234 | 8/1998 | Church et al. | 707/4 |
| 5,806,066 | 9/1998 | Golshani et al. | 707/108 |
| 5,859,972 | 1/1999 | Subramaniam et al. | 709/203 |

*Primary Examiner*—Wayne Amsbury
*Assistant Examiner*—Cheryl R. Lewis
*Attorney, Agent, or Firm*—McDermott, Will & Emery

[57] ABSTRACT

A database server is configured to process original requests received from a client and callback requests received from an external routine. The database server saves global information before calling the external routine to distinguish whether a received request is an original or a callback request. Furthermore, both types of requests can be submitted via the same application programming interface and preferably with the same interprocess communication protocol.

15 Claims, 4 Drawing Sheets

300 RECEIVE CLIENT STATEMENT
302 EXTERNAL ROUTINE?
NO
YES
304 SET FLAG INDICATING EXTERNAL ROUTINE
306 CAUSE EXTERNAL ROUTINE TO EXECUTE
308 CALLBACK RECEIVED?
NO
YES
310 PROCESS CALLBACK
312 CALL TO EXTERNAL ROUTINE?
YES
NO
314 RETURN CALLBACK RESULTS
316 RECEIVE RESULTS
318 COMPLETE EXECUTION
320 EXECUTE LOCALLY

DISPLAY 112
INPUT DEVICE 114
CURSOR CONTROL 116
MAIN MEMORY 106
ROM 108
STORAGE DEVICE 110
BUS 102
PROCESSOR 104
COMMUNICATION INTERFACE 118
100
SERVER 130
128
INTERNET
ISP
126
NETWORK LINK
120
LOCAL NETWORK 122
HOST 124

MECHANISM AND METHOD FOR PERFORMING CALLBACKS

RELATED APPLICATION

This Application is a continuation-in-part of the commonly assigned, U.S. application Ser. No. 08/880,326, entitled "Apparatus and Method for Calling External Routines in a Database System," filed on Jun. 23, 1997 by Jacco Draaijer, Roger Bodamer, and Eric Voss, the contents of which are incorporated by reference herein, allowed.

FIELD OF THE INVENTION

The present invention relates to database systems and, more particularly, to callback mechanisms for external procedures.

BACKGROUND OF THE INVENTION

Users can interact with many database systems by submitting Structured Query Language (SQL) statements to the database systems. SQL is a non-procedural language enabling users to describe a desired operation using reserved SQL commands. The database server then generates procedures based on the SQL commands to perform the desired operation.

One disadvantage of an SQL-based database system is that a user is generally limited to the operations supported by the standard sets of SQL commands. To provide increased flexibility, some database vendors have developed extensions to the SQL language. For example, the PL/SQL language developed by the Oracle Corporation provides a procedural language extension to SQL commands. Although users may invoke defined functions created using standard SQL or PL/SQL commands, conventional database systems do not enable users to invoke external routines, such as routines created using a third generation languages such as "C" or "C++".

Some database systems have attempted to enhance database capabilities by linking external routines directly to server processes, where the linked external routines are executed within the same address space as the server process. This arrangement suffers the disadvantage that the linking of the external routines inherently creates potential operating risks to the database system. For example, if a C program linked to the database server had an execution error, then the error during execution of the C program may result in crashing of the entire database system.

Some database systems have attempted to limit the harmful effects of linked external routines by preventing the external routines from accessing address space that is reserved for critical database server processes. In such cases, however, failures in the linked external routines may still adversely affect the server processes since the server process would need to carefully manage internal operations in order to keep the crash of the external routine from expanding into the database server. Thus, the prior art systems cannot guarantee that a database server will not crash during execution of a linked external procedure.

SUMMARY OF THE INVENTION

There exists a need for a mechanism and method to handle callbacks from an external routine back to a database server. There is also a need to support recursive callbacks. Furthermore, a need exists to allow external routines to be written with the same client-side API.

Accordingly, one aspect of the invention is a method and computer-readable medium bearing sequences of instructions for processing a first request from a client via an application programming interface. The first request is received by a database server executing in an address space and specifies an operation to be executed by an external routine necessary to execute the first request. The database server causes the external routine to be executed, during which execution, the database server receives a second request from the external routine, processes the second request in the address space of the database server and returns the results from processing the second request back to the external routine. Results from executing the external routine are used by the database server to process the first request.

Preferably, the first and second requests are submitted through the same API and parameters for both the first and second requests are obtained according to the same protocol. In other embodiments, global state information is saved and accessed indicating whether or not any external routine is called. In addition, local state information for processing a request is saved before causing the external routine to be executed.

Additional objects, advantages, and novel features of the present invention will be set forth in part in the description that follows, and in part, will become apparent upon examination or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for handling callbacks are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
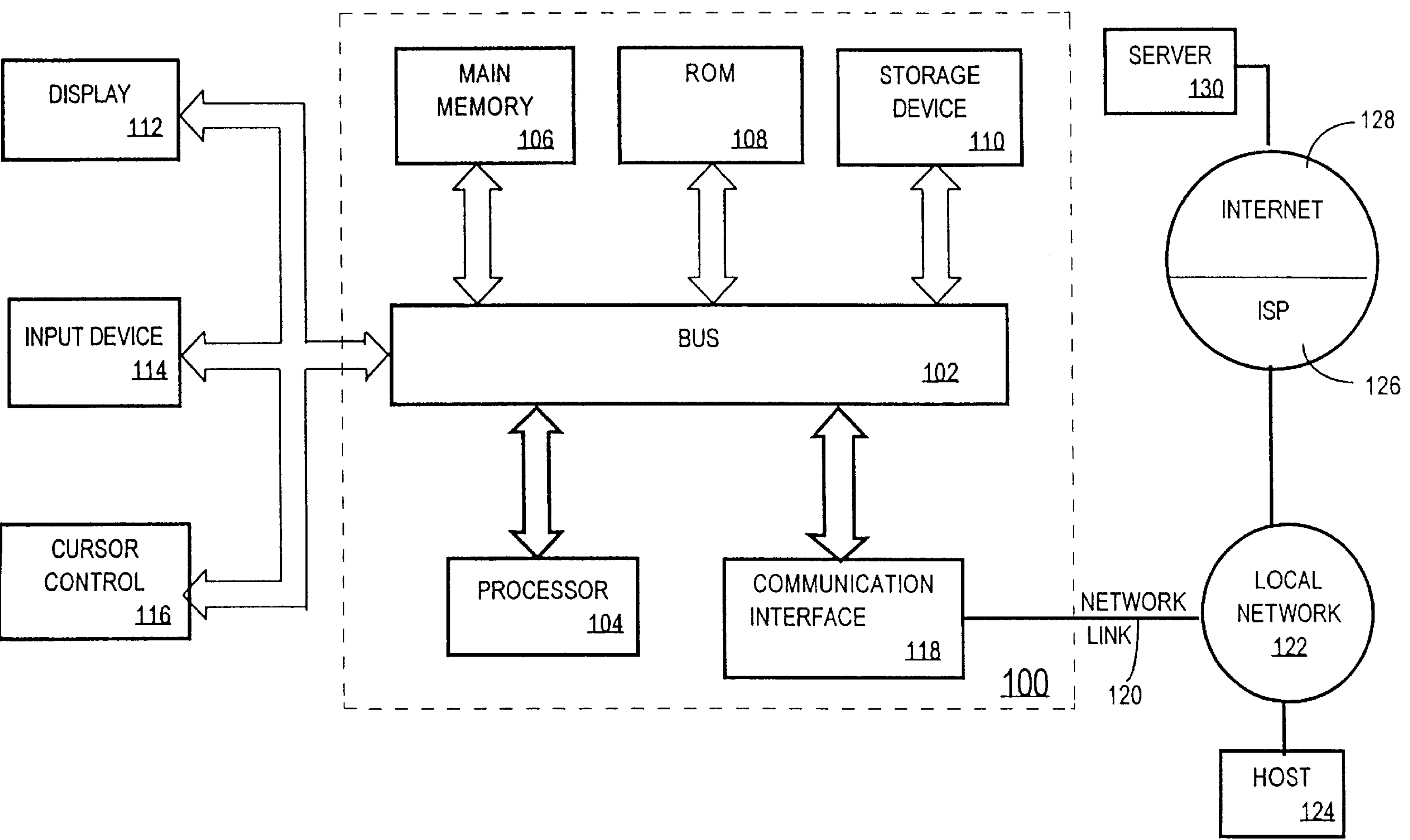
FIG. 1 depicts a computer system upon which the present invention can be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for handling callbacks. According to one embodiment of the invention, handling callbacks is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for handling callbacks as described herein.

The received code may be executed by processor 104 as it is received, and/or stored in storage device 110, or other non-volatile storage for later execution. In this manner, computer system 100 may obtain application code in the form of a carrier wave.

Execution of External Routines

Figure 4:
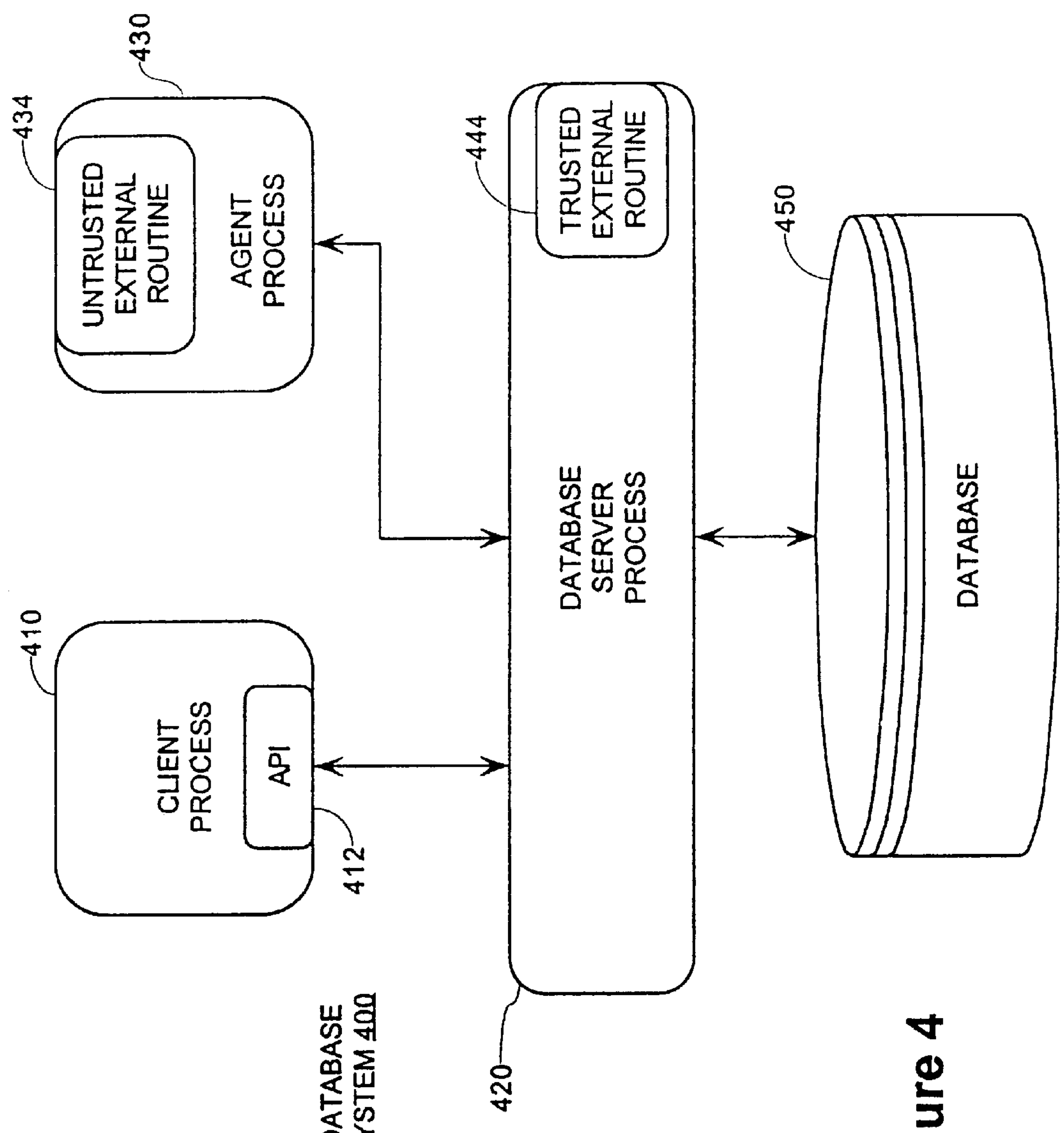
FIG. 4 depicts a database system configured to execute an external routine through an agent process.

Disclosed in U.S. Application Ser. No. 08/880,326, allowed is a novel database system 400, depicted in FIG. 4, in which external routines 434 and 444 can be called by a database server process 420 in response to a request by a client process 410. A client process 410, executing in its own address space, submits a high-level request to perform an operation to a database server process 420 via an application programming interface (API) 412.

An API is a set of interfaces to routines that provide operations for creating, accessing, modifying, and destroying objects in a problem domain. For a database system, the problem domain may include data organized in indexed tables of a relational database. During operation, the API routines translate the client 410's high-level request into a series of lower level requests, which a database server 420 can readily handle. The lower level requests may include, for example, remote procedure calls (RPC) to login, logout, parse a structured query language (SQL) statement into a "cursor," execute the cursor, etc. These lower level requests are transmitted to the database server process 420, which may be executing at the same site as the client process 410 or at another site in the same network.

In response the lower level requests transmitted thereto, the database server process 420 executes instructions for causing the requested operation to be performed. Generally, the requested operation directs the database server process 420 to access, fetch, or store data in a database 450. However, in some cases, the requested operation can involve some processing, especially for an "execute cursor" call, that must be performed by an external routine, written by the customer or by a third party. An external routine 434 or 444 is a function or procedure, typically coded in a third-generation language (3GL) such as C, Pascal, or C++ to perform desired calculations. Such calculations may include, for example, statistical calculations. The disclosed database system provides at least two mechanisms for calling an external routine.

A first mechanism employs an agent process 430 having the desired external routine 434 linked therewith and executing the external routine 434 in an address space that is separate from the address space of the database server process 420. In fact, the agent process 430 may even execute at a different site in the computer network. Thus, the external routine 434 is "safe," since execution errors in the external routine 434, such as segmentation faults, do not cause the database server process 420 to hang or crash. In this case, the database server process 420 initiates a connection with the agent process 430 and submits a request to the agent process 430 to perform the requested operation. The agent process 430 thus receives the request and calls the external routine 434 to perform the requested operation and passes the results of the operation back to the database server process 420. In response, the database server process 420 performs additional processing based on those results, as necessary, and ultimately completes execution of the request operation.

A second mechanism is for trusted external procedures 444. A trusted external procedure 444 is an external routine that has been validated by the vendor of the database system or developed by a third party trusted by the database vendor. In this situation, external routines deemed reliable can be archived in a dynamic link library (DLL) 440 and linked directly into the database server process 420 at run-time. In this manner, the database server process 420 can execute the external routine 444 without the interprocess communication overhead incurred for executing the agent process 430. The database server process 420, however, is more susceptible to run-time errors in the external routine 444 executing in the same address space, hence the need for validating or otherwise deeming the external routine 444 to be reliable or "trusted."

Accordingly, external routines 434 and 444 allow developers of clients 410 to offload processing onto a different site in the network, whether that site is the same site as that of the database server process 420 or another site. Offloading processing improves the overall performance and maintainability of clients 410.

In order to more filly support the offloading of processing from a client 410, it is desirable that mechanisms for handling external routines 434 and 444 be able to utilize the database server process 420 to access and update the database 450. In other words, there is a need for a method and mechanism that enables an external routine 434 or 444 to execute a "callback" to the database server process 420 that invoked the external routine 434 or 444. Since the callback may eventually invoke another or the same external routine 434 or 444, it is desirable to support nested and recursive callbacks.

To aid in the development of new external routines from functions written for clients 410, it is also desirable to reuse the same client-side API 412. In other words, there is a need for an external routine 434 or 444 to have the ability to invoke a callback to the database server process 420 using the same API 412 used by the client 410.

Reuse of Client-Side APIs

Figure 2:
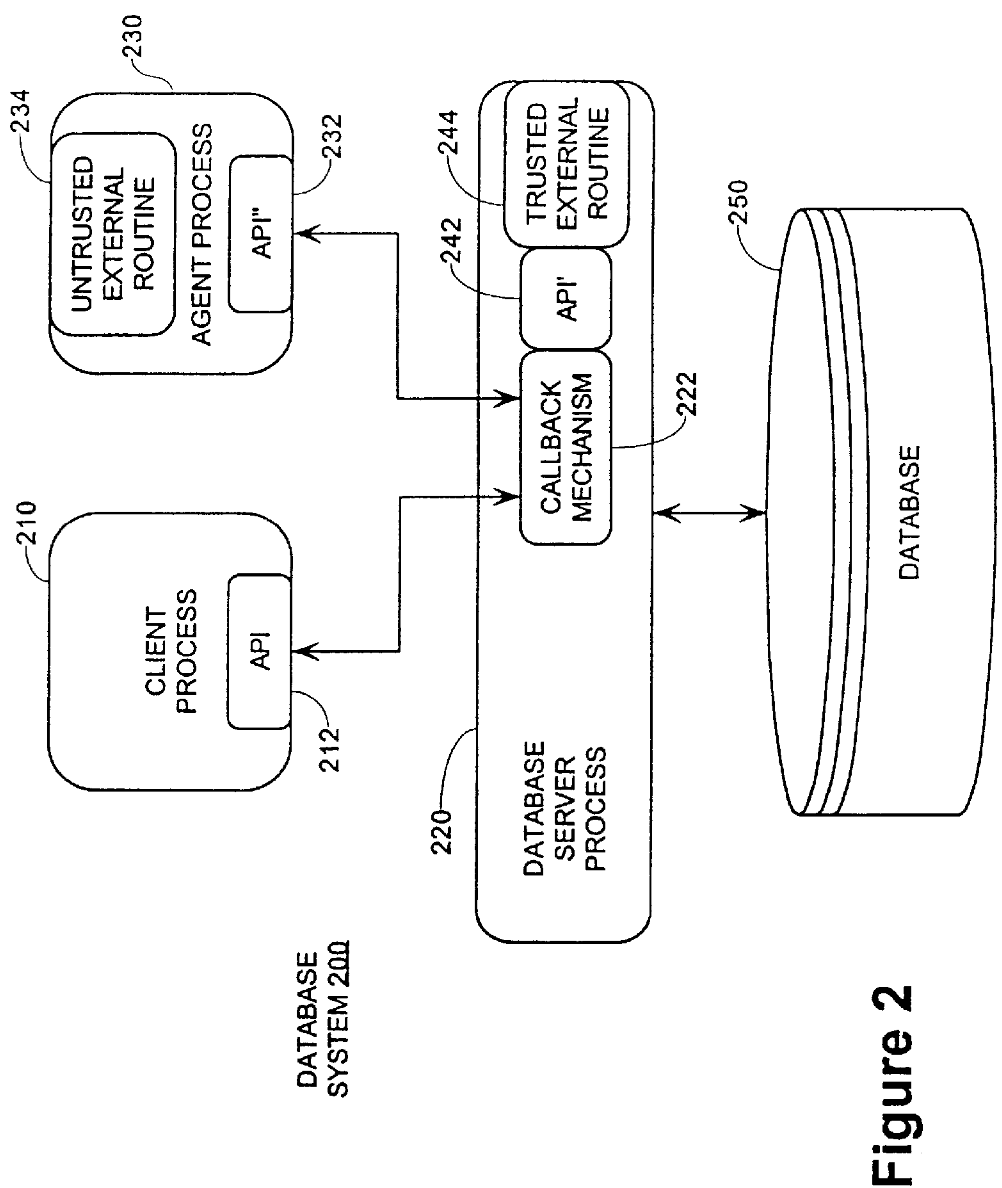
FIG. 2 depicts a database system according to one embodiment of the present invention.

According to one embodiment of the invention shown in FIG. 2, a callback mechanism 222 is provided as part of the database server process 220 to handle the same kinds of lower level requests from agent process 230 and DLL 240 as those lower level requests produced by client-side API 212 for client process 210. The client-side API 212 translates higher level API 212 calls into lower level requests submitted to the callback mechanism 222 via an RPC mechanism. Generally, these lower level requests include calls to parse an SQL statement into a cursor and then to execute the cursor. For example, an SQL statement can specify certain database operations to be performed on database 250, e.g. to "select," "insert," or "delete" data within indexed tables.

In accordance with the disclosed embodiment, an agent process 230, executing in a separate address from the database server process 220, includes a set of entry points that presents substantially the same API" 232 as client-side API 212. Specifically, API" 232 presents an identical, or nearly identical, set of functions as in client-side API 212 to the safe external routine 234 in the agent 230. In some implementations, the API" 232 includes a strict subset of the functions in the client-side API 212, except for certain operations, such as logging in or logging out, which are not appropriate for external routines that execute only in an established session.

The implementation of API" 232 translates higher level API" 232 calls, which are mostly identical to API 212 calls, into lower level requests submitted to the callback mechanism 222 via an RPC mechanism. Generally, these lower level requests include calls to parse an SQL statement into a cursor and then to execute the cursor. For example, an SQL statement can specify certain database operations to be performed on database 250, e.g. to "select," "insert," or "delete" data within indexed tables.

Preferably, the RPC mechanism used by API" 232 to communicate with callback mechanism 222 employs the same protocol that API 212 uses to communicate with the database server process 220. If, on the other hand, agent process 230 normally communicates with database server process 220 via a different protocol than the protocol used by client process 210 in communicating with database server process 220, then one of at least two approaches may be adopted. In one approach, the callback mechanism 222 is coded to include instructions for handling the different protocols. In an alternative approach, the implementation of the API" 232 suspends the normal communication protocol for the agent process 230 for the duration of the API" 232 call and utilizes the same communication protocol as for the client process 210.

Furthermore, for a trusted external routine 244 in DLL 240, there is provided another set of entry points that presents substantially the same API' 242 as client-side API 212. Specifically, API' 242 presents an identical, or nearly identical, set of functions as in client-side API 212 to the trusted external routine 244 in the DLL 240. In some implementations, the API' 242 includes a strict subset of the functions in the client-side API 212, except for certain operations, such as logging in or logging out, which are not appropriate for external routines that execute only in an established session.

The implementation of API' 242 translates higher level API' 242 calls, which are mostly identical to API 212 calls, into a series of function calls directly into the callback mechanism 222 equivalent to the lower level requests generated by the other APIs. For example, API 212 may submit, on one hand, a "parse" request via an RPC mechanism to callback mechanism 222, which receives the parameters for the request and calls the "parse" function in the database server process 220.

On the other hand, API' 242 may call the "parse" function directly. A normal function call mechanism is used for communication between DLL 240 and database server process 220, since the API' 242 functions are executed in the same address space as that of database server process 220. In addition, the API' 242 functions may place the parameters for the requests in a buffer, which is read by the request processing portions of callback mechanism 222, so as to reuse as much of the request handling infrastructure as possible.

Generally, these function calls, equivalent to the lower-level requests, include calls to parse an SQL statement into a cursor and then to execute the cursor. For example, an SQL statement can specify certain database operations to be performed on database 250, e.g. to "select," "insert," or "delete" data within indexed tables.

Operation of the Callback Mechanism

The callback mechanism 222 is configured to receive the lower-level requests from a routine in a client process 210 via API 212, from a safe external routine 234 in an agent process 230 via API" 232, or from a trusted external routine 244 in DLL 240 via API' 242. Since the behavior of the callback mechanism 222 differs somewhat depending on which API generates the lower-level requests, the callback mechanism 222 accesses global state information within database server process 220 to distinguish whether the request is received from a client routine or the agent process 230.

For example, the callback mechanism may be configured to check a state variable that indicates whether the next request to be received is from an external routine. When the database server is first initialized, this state variable is cleared to indicate that the next request is to be received from a client process 210. Accordingly, the next request submitted thereto is considered by the callback mechanism 222 to be from a client process 210 via API 212. In response, the callback mechanism 222 sets the state variable to indicate that the next request is from an external routine, sets up a session and/or transaction, and processes the request. When processing for this request finally completes, the callback mechanism clears the state variable again.

Figure 3:
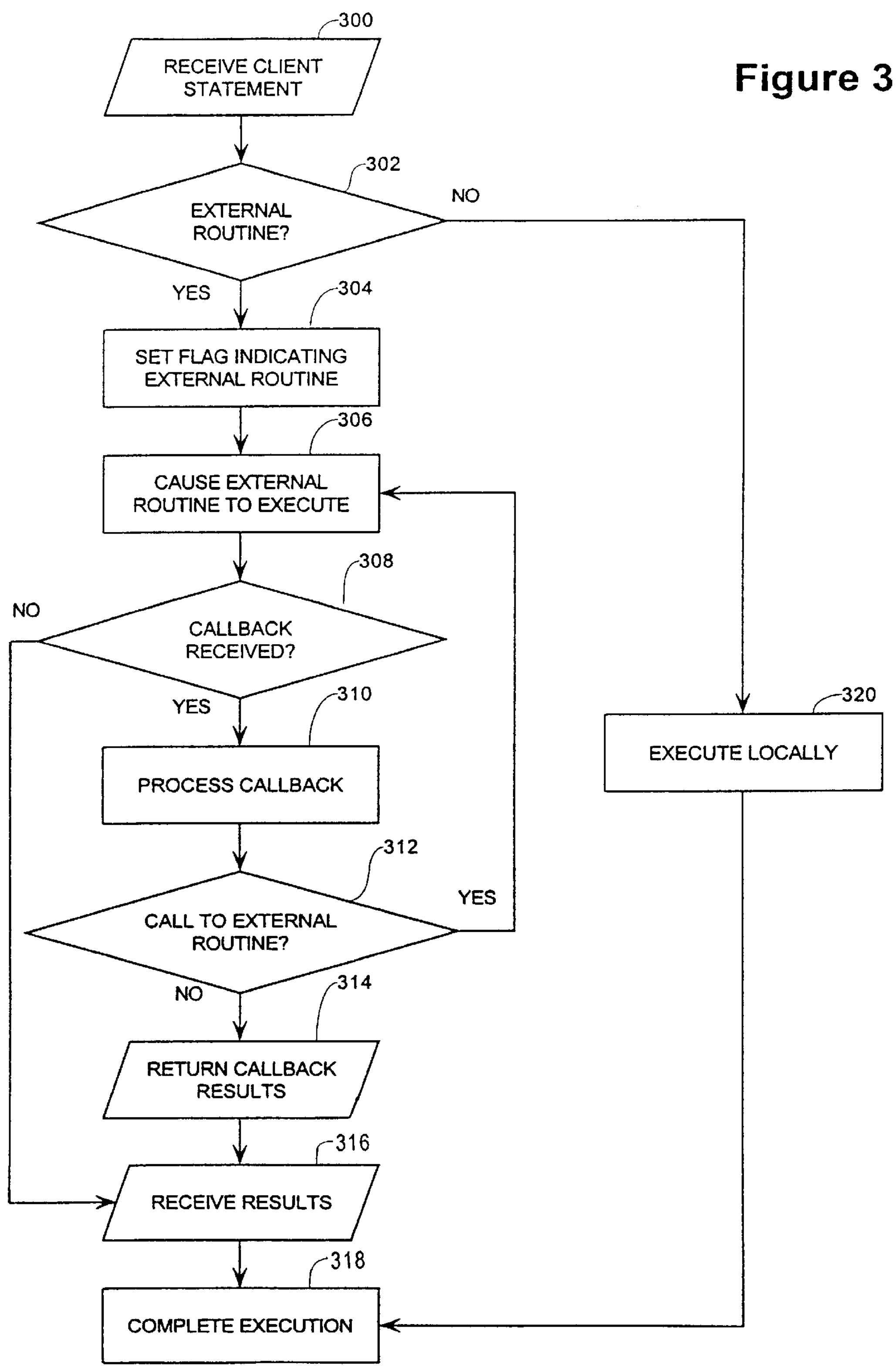
FIG. 3 is a flowchart illustrating how a request is processed according to an embodiment of the present invention.

When, on the other hand, the callback mechanism receives a request and the state variable indicates that the next request is from an external routine, then the callback mechanism reuses the current session and transaction information. Referring to FIG. 3, a flowchart illustrates the operation of one embodiment of the invention from the perspective of the database server process 220.

When a client process 210 is executing, it may make a call through API 212 to request the database server process 220 to perform some database operation. This call is translated within the API 212 into a series of lower-level requests that are submitted to the database server process 220. For example, one API 212 call may first be translated into the lower-level request: "parse 'select * from table1 where a=foo(b)'". In this request, 'select * from table1 where a=foo(b)' is an SQL statement and "foo" is the name of an external routine 234 in agent process 230.

Accordingly, in step 300, the callback mechanism 222 receives this "parse" request from an RPC mechanism. During this step, the callback mechanism 222 checks the global state information for a state variable that indicates whether the request came from a client process 210 or from an external routine 234 or 244. Upon initialization, this state variable is clear, indicating a request from a client process 210. Accordingly, the database server process 220 performs the appropriate session/transaction-related operations to handle the request and sets the state variable.

At step 302, the database server process 220 determines whether it is necessary to execute an external routine to process the request. In the example of a "parse" request, execution of an external routine is not generally necessary, so the request is executed locally (step 320). For a parse request, the database server process 220 typically compiles the SQL statement into a cursor, allocating and initializing memory for executing the SQL statement (e.g. sets up bind variables), among other operations. After performing step 320, execution proceeds to step 318, where processing is completed, in which the state variable is cleared and the results are passed back to client process 210. In this example, the result of a parse request may be a handle for the cursor set up by database server process 210.

The API 212, then, receives the cursor handle back from database server process 210 and typically proceeds to submit another lower level request, this time to execute the cursor. The execute request is received by the database server process 220 in step 300, with the state variable still indicating a client request. Accordingly, the callback mechanism fetches the arguments for the request (in this case, a cursor handle) and calls a database server process 220 routine to execute the cursor identified by the cursor handle.

In step 302, the database server process determines whether execution of the cursor identified by the cursor handle requires the execution of an external routine, for example, by consulting metadata or other system information. In this example, executing the cursor requires the execution of the "foo" external routine 234 in agent 230. Thus, the decision block of step 302 branches to step 304, where the state variable, which can be a flag, is set to indicate that an external routine is called. Thereupon, in step 306, the database server process 220 causes the external routine to be executed. Since metadata for this external routine 234 indicates that it is implemented in agent process 230, the database server process 220 spawns off the agent process 230, if necessary, and calls the external routine 234 via an RPC mechanism.

Execution of the external "foo" routine 234 in agent process 230 may involve calls to API" 232. For example, one call to API" 232 may result in two lower-level requests to database server process 210, to parse a "select * from table2 where a=bar(b)+baz(c)" SQL statement and execute it, where "bar" is another safe external routine in agent 230 and "baz" is a trusted external routine 244 in DLL 240. These lower-level requests from API" 232 are "callback requests."

Accordingly, the callback mechanism 222 receives the "parse" callback request in step 308, fetching the parameters, e.g. a string containing the SQL statement. Since the state variable indicates an external routine, the same session/transaction as the original request is reused for the callback request. The callback request is processed (step 320), in the example, parsing the SQL statement into a second cursor without overwriting the memory space for the first cursor. In one implementation, the cursors are placed on a stack. Maintaining a cursor for each callback request enables nested and recursive callbacks from external routines to be implemented. Since parsing an SQL statement does not generally result in executing an external routine (decision step 312), the callback results, in this case a second cursor handle, is returned to agent process 230.

When the results of parsing the statement are passed back to agent process 230, the API" 232 typically follows with a submission of an execute callback request to have the database server process 220 perform the SQL operation. In this case, the execute callback request is received in step 310 and processed. During the execution of the second SQL statement, calls to the "bar" safe external routine in agent 230 and to the "baz" trusted external routine 244 in DLL 240 need to be made. Accordingly, execution loops back to step 306, where the two routines are called. The safe external routine is called via an RPC mechanism to agent process 230, and the trusted external routine 244 in DLL 240 is called via a normal function call mechanism. Nested and recursive invocations of external routines and callbacks are performed as necessary to complete the processing of the second SQL statement.

When the processing of the execution of the second SQL statement is complete, the callback mechanism 222 returns the results back to the agent process 230, which submitted the callback request (step 314). Thereupon, the execution of the external routine ("foo," in this example) continues, generating results. These results are sent from the agent process 230 and received by the database server process 220 (step 316). Finally, the database server process 220 completes the execution of the request, for example, clearing the state variable and passing the results back to client process 210.

Therefore, there is described a preferred embodiment of a database system in which external routines can make the same API calls to a database server as in a client. Furthermore, this embodiment is capable of handling nested and recursive invocations of callbacks.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of processing a first request from a client, comprising the steps of:

receiving the first request by a database server that is executing in a first address space, said first request specifying a first operation to be executed by a first external routine necessary to execute the first request;

causing an agent executing in a second address space separate from the first address space to execute the first external routine for performing the first operation;

processing the first request by the database server based on results from executing the first external routine; and responsive to causing the agent to execute the first external routine, performing the steps of:

receiving a second request by the database server from the first external routine;

processing the second request within the first address space; and returning results from processing the second request back to the first external routine.

2. The method of claim 1, further comprising the step of, before performing the step of causing the first external routine to be executed, saving data within a set of global state information to indicate that an external routine is being called.

3. The method of claim 2, further comprising the steps of:

accessing the data within the global state information that indicates whether an external routine is being called;

if the data indicates that an external routine is not being called, then setting up a session for handling an incoming request; and if the data indicates that an external routine is being called, then reusing the session for handling the incoming request.

4. The method of claim 1, further comprising the step of, before performing the step of causing the first external routine to be executed, saving local state information for processing the first request.

5. The method of claim 1, wherein:

the step of receiving a second request from the first external routine includes the steps of receiving the second request, said second request specifying a second operation to be executed by a second external routine necessary to execute the second request; and the step of processing the second request includes the step of:

causing the second external routine to be executed for performing the second operation; and processing the second request by the database server based on results from executing the second external routine.

6. The method of claim 1, wherein the step of causing the agent to execute the first external routine includes the step of initiating a connection between the database server and the agent that is executing in the second address space separate from the first address space.

7. A method of processing a first request from a client process, comprising the steps of:

said client process submitting the first request to a database server through the application programming interface, said first request specifying a first operation to be executed by a first external routine necessary to execute the first request;

said database server causing the external routine to be executed for performing the operation;

said database server processing the request based on results from executing the external routine; and responsive to causing the external routine to be executed, performing the steps of:

said external routine submitting a second request through another application programming interface that is a subset of the first application programming interface;

said database server receiving the second request from the first external routine;

said database server processing the second request; and returning results from processing the second request back to the first external routine.

8. The method of claim 7, wherein:

the step of submitting the first request includes the step of submitting first parameters for the first request according to a protocol used by said application programming interface; and the step of submitting a second request includes the step of submitting second parameters for executing the second request according to said protocol.

9. A computer-readable medium bearing sequences of instructions for causing one or processors to process a first request from a client, said sequences of instructions comprising sequences of instructions for performing the steps of:

receiving the first request by a database server that is executing in a first address space, said first request specifying a first operation to be executed by a first external routine necessary to execute the first request;

causing an agent executing in a second address space separate from the first address space to execute the first external routine for performing the first operation;

processing the first request by the database server based on results from executing the first external routine; and responsive to causing the agent to execute the first external routine, performing the steps of:

receiving a second request by the database server from the first external routine;

processing the second request within the first address space; and returning results from processing the second request back to the first external routine.

10. The computer-readable medium of claim 9, wherein:

the step of receiving the first request by a database server includes the step of receiving first parameters for the first request according to a protocol used by said application programming interface; and the step of receiving a second request from the first external routine includes the step of receiving second parameters for executing the second request according to said protocol.

11. The computer-readable medium of claim 9, wherein said sequences of instructions further comprise sequences of instructions for performing the step of, before performing the step of causing the first external routine to be executed, saving data within a set of global state information to indicate that an external routine is being called.

12. The computer-readable medium of claim 11, wherein the sequences of instructions further include instructions for performing the steps of:

accessing the data within the global state information that indicates whether an external routine is being called;

if the data indicates that an external routine is not being called, then setting up a session for handling an incoming request; and if the data indicates that an external routine is being called, then reusing the session for handling the incoming request.

13. The computer-readable medium of claim 9, wherein said sequences of instructions further comprise sequences of instructions for performing the step of, before performing the step of causing the first external routine to be executed, saving local state information for processing the first request.

14. The computer-readable medium of claim 9, wherein:

the step of receiving a second request from the first external routine includes the steps of receiving the second request, said second request specifying a second operation to be executed by a second external routine necessary to execute the second request; and the step of processing the second request includes the step of:

causing the second external routine to be executed for performing the second operation; and processing the second request by the database server based on results from executing the second external routine.

15. The computer-readable medium of claim 9, wherein the step of causing the agent to execute the first external routine includes the step of initiating a connection between the database server and the agent that is executing in the second address space separate from the first address space.

* * * * *